Figure 1:
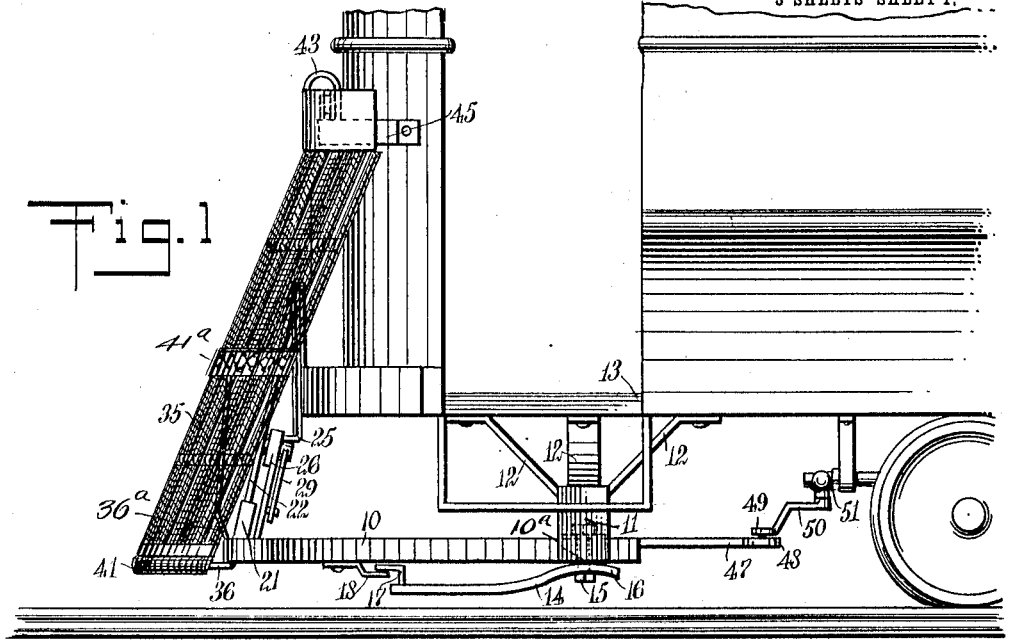

C. B. MARTIN.
CAR FENDER.
APPLICATION FILED SEPT. 28, 1910.

1,035,621.

Patented Aug. 13, 1912.
3 SHEETS—SHEET 1.

WITNESSES:

INVENTOR
Charles B. Martin
BY
ATTORNEYS

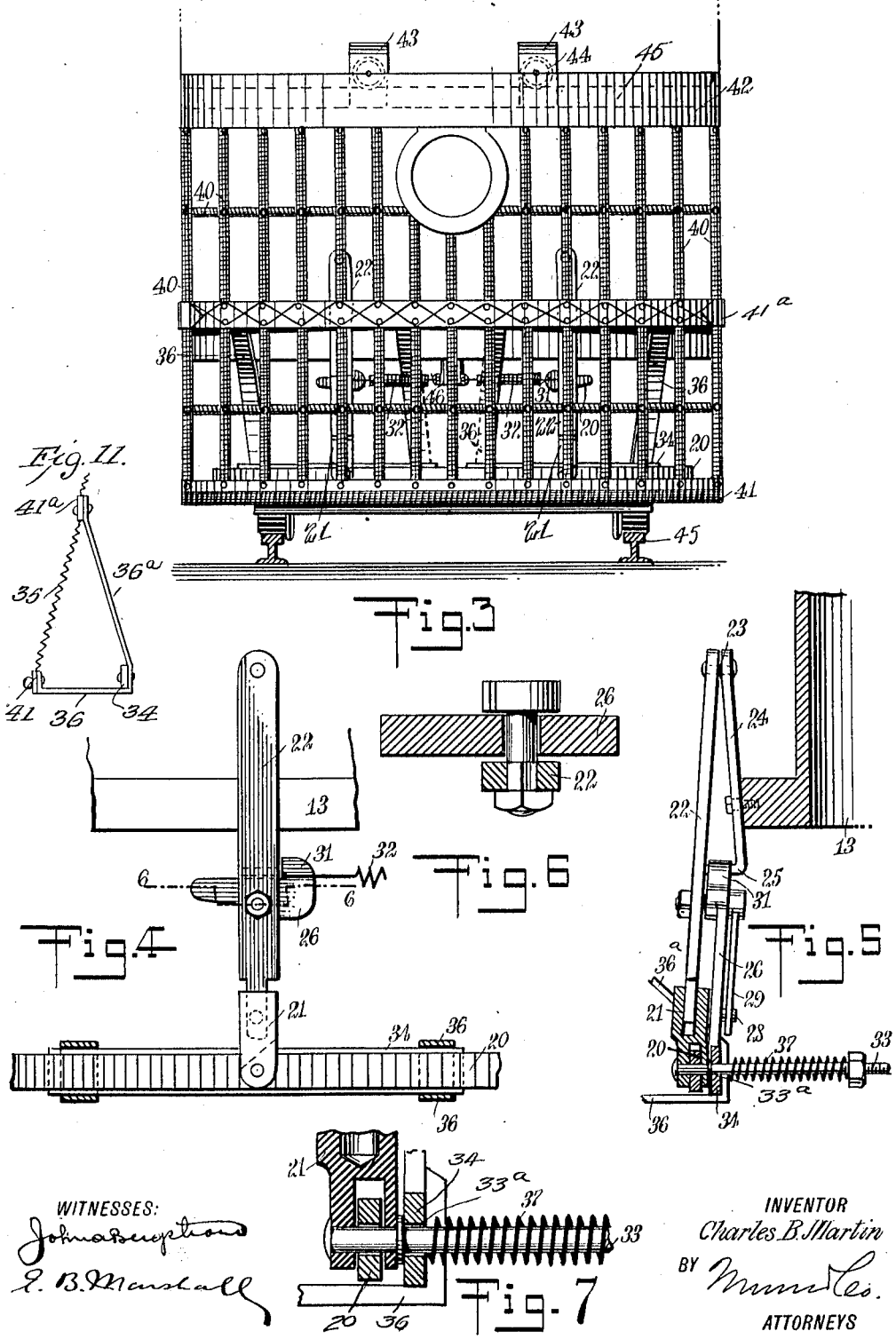

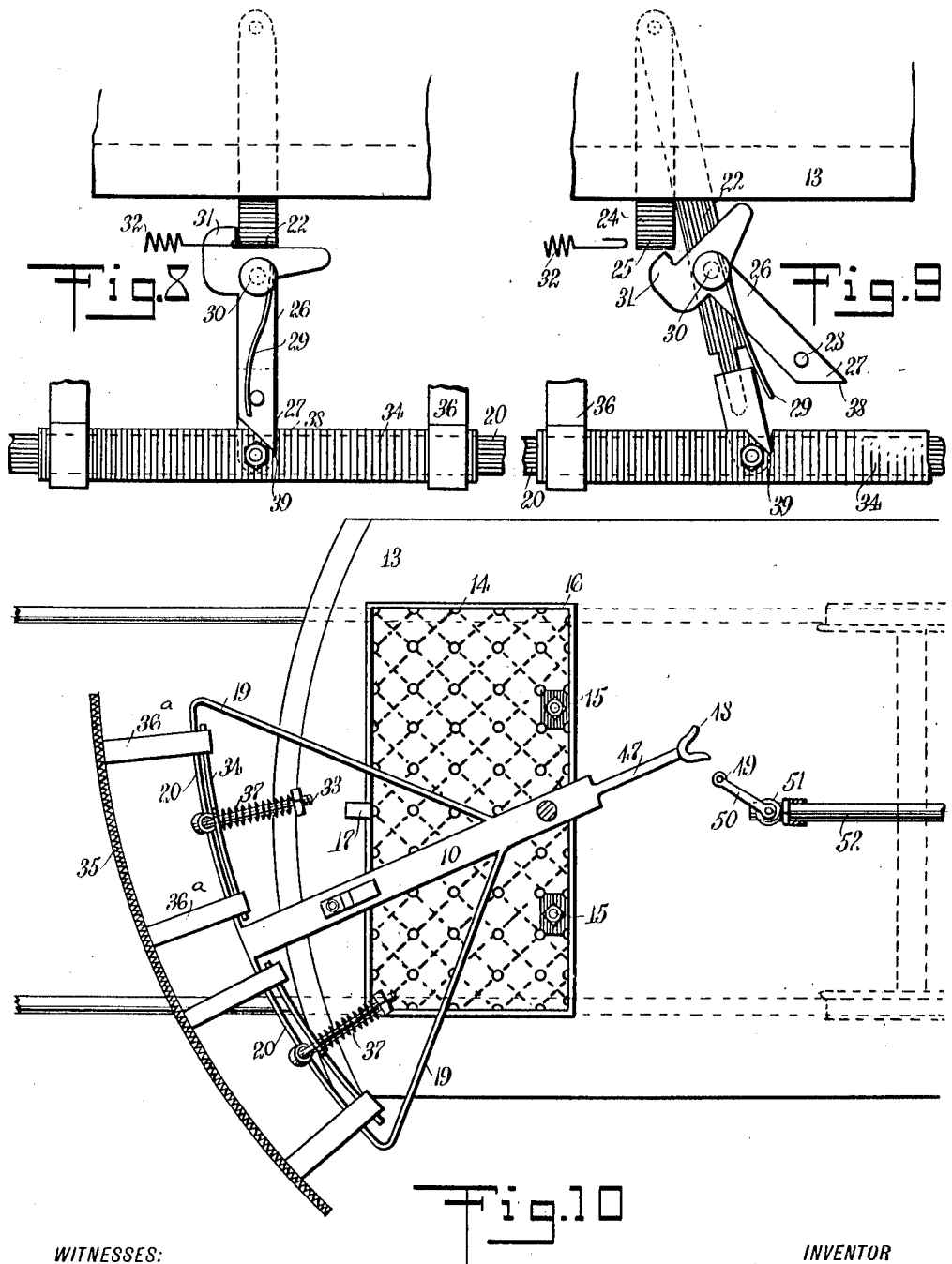

UNITED STATES PATENT OFFICE.

CHARLES B. MARTIN, OF PORTLAND, OREGON.

CAR-FENDER.

1,035,621.   Specification of Letters Patent.   Patented Aug. 13, 1912.

Application filed September 28, 1910. Serial No. 584,332.

*To all whom it may concern:*

Be it known that I, CHARLES B. MARTIN, a citizen of the United States, and a resident of Portland, in the county of Multnomah and State of Oregon, have invented a certain new and useful Car-Fender, of which the following is a full, clear, and exact description.

My invention relates to car fenders and it has for its object to provide one which is mounted for traveling on a rail secured to the car, locking means being provided for holding the fender in normal position until it is pressed rearwardly, when the locking means are freed and the fender is moved to the side which has come in contact with the obstruction which has pressed it rearwardly. Springs are provided to assist in moving the fender to one side.

Another object of the invention is to provide a pivoted apron which is normally disposed in a horizontal position, but which is permitted to drop when the fender is moved to either side.

Still another object of the invention is to provide means for operating the brake mechanism when the fender is moved by contact with an obstruction.

Additional objects of the invention will appear in the following complete description in which the preferred form of my invention is fully disclosed.

In the drawings similar reference characters refer to similar parts in all the views in which—

Figure 2:
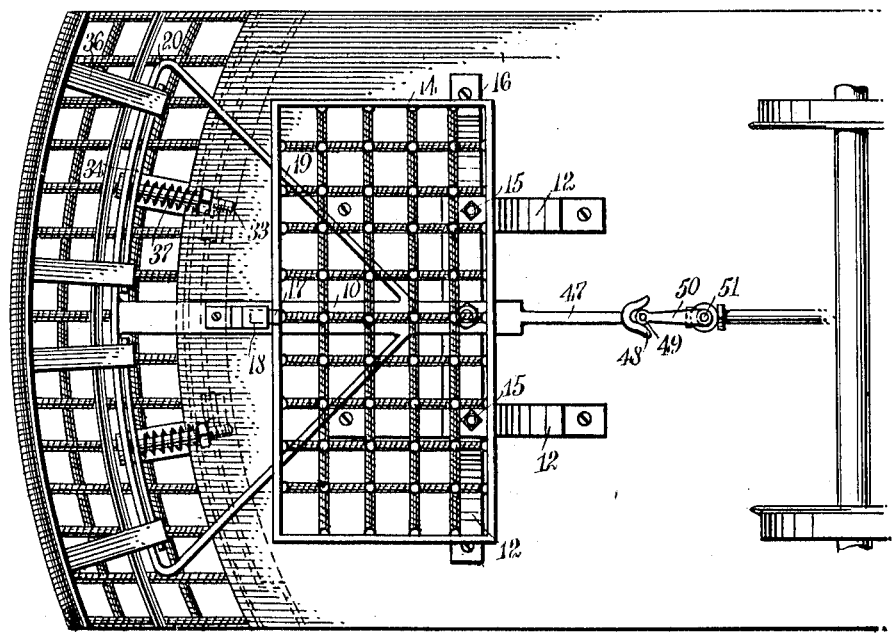

Figure 1 is a side elevation showing the fender mounted on a car; Fig. 2 is an inverted plan view of Fig. 1; Fig. 3 is a front elevation of the fender; Fig. 4 is a fragmentary view showing the connection of the link with the pivoted frame; Fig. 5 is a side elevation of Fig. 4; Fig. 6 is a sectional view on the line 6—6 of Fig. 4; Fig. 7 is an enlarged fragmentary sectional view showing the method of holding the frames yieldingly together; Fig. 8 is a view showing the members disclosed in Fig. 4 looking from the rear; Fig. 9 is a view similar to that shown in Fig. 8 but with the locking means freed; Fig. 10 is a sectional plan view showing the pivoted frame, the apron disposed thereunder, the mat, and the means by which the mat is connected with the pivoted frame and Fig. 11 is a fragmentary view showing the arms by which the frame members are connected with the mat.

By referring to the drawings it will be seen that the frame 10 is pivoted at $10^a$ to the support 11 which is connected by means of the members 12 with the car 13. An apron 14 is disposed under the pivoted frame 10, this apron having openings in which are freely disposed bolts 15, which are secured to the support 11. The rear of the apron 14 is curved as at 16 so that the forward end of the apron may drop to the ground when it is unsupported. A flange 17 is secured to the forward end of the apron 14, this flange 17 being adapted to be engaged by a flange 18 extending downwardly from the pivoted frame 10. The frame 10 has rods 19 which diverge toward the front of the fender, the forward ends of which are connected by a curved forward portion 20 of the frame 10. Two bearing members 21 are spaced apart and are pivoted to the curved portion 20 of the frame 10, links 22 being provided which have their lower terminals disposed in the bearings in the bearing members 21. The upper terminals of the links 22 are pivoted at 23 to members 24 which extend downwardly and which are secured to the car 13. The lower portions of the members 24 are bent outwardly to form flanges 25. Locking members 26 are pivoted to the links 22, these locking members having depending arms 27 with pins 28 projecting therefrom which are adapted to be engaged by springs 29 secured to the pivot at 30. The locking members 26 are also provided with upwardly extending portions 31 which are adapted to engage the flanges 25, springs 32 being provided with bent terminals which are adapted to be disposed on the said upwardly projecting portions 31 of the locking members 26. Projecting rearwardly from the curved portion 20 of the frame 10 there are two bolts 33 which project through orifices $33^a$ in the frame members 34 respectively. These frame members 34 are two in number and they are connected with the mat 35 by means of arms 36 and $36^a$. As will best be seen by referring to Fig. 11 of the drawings the arms 36 are disposed horizontally and are secured to the rod 41, while the arms 36ª are disposed upwardly and are secured to the band 41ª. Springs 37 are wound on the bolts 33, these springs 37 being adapted for pressing the frame members 34 forwardly and against the curved portions 20 of the pivoted frame member 10. The free terminals of the arms 27 of the locking members 26 are pointed as at 38 and are adapted to be disposed in recesses 39 in the frame members 34 respectively.

The mat 35 is constructed of a plurality of vertically and horizontally disposed coil springs 40 which are connected at the bottom to a rod 41 to which the arms 36 are secured, the vertically disposed coil springs 40 being connected to a transverse band 41ª and a band 42 to which brackets 43 are secured, rollers 44 being held in these brackets, the rollers 44 being provided for traveling on a rail 45, secured to the dashboard of the car 13.

Projecting downwardly from the car as best seen in Fig. 3 of the drawings there is a bracket 46, the springs 32 being secured to the said bracket 46; one at each side. The hooks at the outer ends of the springs 32 are adapted to be disposed over the upwardly extending portions 31 of the locking members 26 as has been described. An arm 47 is secured to and projects rearwardly from the pivoted frame 10, this arm 47 having fingers 48 which are adapted to engage a stud 49 on an arm 50 of a valve 51, connected with the train pipe 52 of the brake system.

The car fender having been constructed in the manner set forth, it will be seen that when one side of its mat comes in contact with an obstruction the mat will be pressed rearwardly carrying with it the frame member 34 secured to that side of the mat. When this frame member 34 is moved rearwardly the pointed free terminal of the arm 27 of the locking member 26 at that side of the fender will be freed from the recess 39 in the said frame member 34 which will permit the spring 29 which engages the pin 28 to move the said locking member outwardly. When this takes place, the upwardly extending portion 31 of the locking member 26 will be moved downwardly, and the outer terminal of the spring 32 will be thereby freed from the said locking member. When this takes place the spring 32 secured to the locking member at the other side of the car will pull the locking member on the other side of the car inwardly, thereby moving the fender laterally, the upper portion of the mat traveling on the rail 45 which has been described. This is so for the springs 32 have one set of terminals secured to the bracket 46, the other terminals of the springs being connected to the upwardly extending portions 31 of the locking members 26 respectively. When one spring is freed from one of the locking members 26, the other spring at once draws the other locking member toward the center line of the device. As the mat with the frame members 34 and the pivoted frame member 10 is moved by the spring 32, which has not been freed, the flange 17 will be freed from the flange 18, and the forward portion of the apron 14 will be unsupported, and will fall to the ground. At the same time the fingers on the arm 47 will throw the arm 50 of the valve 51 to open the valve and apply the brakes in the manner understood in the art by the reduction of train pipe pressure.

It will be understood that the mat, the frame members 34 and the pivoted frame 10 may be moved to either side by the contact of the mat with an obstruction, the mat with the pivoted frame moving in the direction of the side which has come in contact with the obstruction.

It will be seen that the links 22 are pivoted on axes which from one end to the other are disposed on lines extending from the front to the rear of the car fender, and that the curved portion 20 of the frame 10 has the bearing members 21 pivoted to it, these bearing members 21 serving as link-engaging means, with which the links 22 engage. The links 22 assist in giving a lateral movement of the frame, to carry the mat 35 laterally, by means of the arms 36 and 36ª.

Having thus described my invention I claim as new and desire to secure by Letters Patent:

1. In a car fender a frame having link engaging means, a link pivoted on an axis which from one end to the other is disposed on a line extending from the front to the rear of the car fender, and engaging the means on the frame, means for locking the link in a predetermined position relatively to the frame, a mat, and means by which the mat is carried by the frame.

2. In a car fender a frame having a bolt, a frame member having an opening in which the bolt is disposed, a spring on the bolt for holding the frame member against the frame, and a mat secured to the frame member.

3. In a car fender a frame having two bolts, two frame members having openings in which the bolts are disposed respectively, springs on the bolts respectively for holding the frame members yieldingly relatively to the first-mentioned frame, and a mat secured to the frame members.

4. In a car fender a frame, a pivoted link attached to the frame, a second frame mounted for moving relatively to the first-mentioned frame, a mat secured to the second frame, and means for locking the link which is held in a predetermined position by the second frame.

5. In a car fender a frame, a link attached to the frame, a member, a locking member pivoted to the link for engaging the first-mentioned member, and a second frame mounted for moving relatively to the first-mentioned frame, the locking member being engaged by the second-mentioned frame.

6. In a car fender a frame, a link attached to the frame, a member, a locking member pivoted to the link for engaging the first-mentioned member, a second frame mounted for moving relatively to the first-mentioned frame, the locking member being engaged by the second-mentioned frame, and means for holding the locking member yieldingly in a predetermined position.

7. In a car fender a frame, a link engaging the frame, a member, a locking member having a terminal pivoted to the link for engaging the first-mentioned member, a bolt secured to the frame, the second frame having a recess and an orifice, the bolt being disposed in the orifice, and a spring mounted on the bolt for holding the second frame in the direction of the first-mentioned frame, the terminal of the locking member being normally disposed in the recess.

8. In a car fender a frame, a link engaging the frame, a member, a locking member having a terminal pivoted to the link for engaging the first-mentioned member, a bolt secured to the frame, the second frame having a recess and an orifice, the bolt being disposed in the orifice, a spring mounted on the bolt for holding the second frame in the direction of the first-mentioned frame, the terminal of the locking member being normally disposed in the recess, and a mat secured to the second frame.

9. In a car fender a frame, a link engaging the frame, a member, a locking member having a terminal pivoted to the link for engaging the first-mentioned member, a bolt secured to the frame, the second frame having a recess and an orifice, the bolt being disposed in the orifice, a spring mounted on the bolt for holding the second frame in the direction of the first-mentioned frame, the terminal of the locking member being normally disposed in the recess, a mat secured to the second frame, a rail, and members mounted on the mat for traveling on the rail.

10. In a car fender a frame, a link engaging the frame, a member, a locking member having a terminal pivoted to the link for engaging the first-mentioned member, a bolt secured to the frame, the second frame having a recess and an orifice, the bolt being disposed in the orifice, a spring mounted on the bolt for holding the second frame in the direction of the first-mentioned frame, the terminal of the locking member being normally disposed in the recess, and a spring for holding the locking member in a predetermined position relatively to the link.

11. In a car fender a support, a frame pivoted to the support, a link engaging the frame, a member, a locking member having a terminal pivoted to the link for engaging the first-mentioned member, a bolt secured to the frame, a second frame having a recess and an orifice, the bolt being disposed in the orifice, and a spring mounted on the bolt for holding the second-mentioned frame in the direction of the first-mentioned frame, the terminal of the locking member being normally disposed in the recess.

12. In a car fender a support, a frame pivoted to the support, a link attached to the frame, a member, a locking member pivoted to the link for engaging the first-mentioned member, and a second frame mounted for moving relatively to the first-mentioned frame, the locking member being engaged by the second-mentioned frame.

13. In a car fender a support, a frame pivoted to the support, a link attached to the frame, a member, a locking member pivoted to the link for engaging the first-mentioned member, a second frame mounted for moving relatively to the first-mentioned frame, the locking member being engaged by the second-mentioned frame, a rail, a mat, and members mounted on the mat for traveling on the rail.

14. In a car fender a frame, two pivoted links engaging the frame, two members, two locking members pivoted to the links for engaging the first-mentioned members respectively, an additional member, two springs secured to the additional member the springs engaging the locking members respectively, and additional frames for moving relatively to the first-mentioned frame, the locking members being normally engaged by the said additional frames.

15. In a car fender a frame, two pivoted links engaging the frame, two members, two locking members pivoted to the links for engaging the first-mentioned members respectively, an additional member, two springs secured to the additional member the springs engaging the locking members respectively, additional frames for moving relatively to the first-mentioned frame, the locking members being normally engaged by the said additional frames, a rail, and a mat secured to the frame having means for traveling on the rail.

16. In a car fender a frame, two pivoted links engaging the frame, two members, two locking members pivoted to the links having extending portions for engaging the first mentioned members respectively, an additional member, two springs secured to the additional member and which are adapted to be hooked on the extending portions of the locking members respectively when they are in predetermined positions, and which will be freed when the locking members rotate on their pivots, and additional frames for moving relatively to the first-mentioned frame, the locking members being normally engaged by the additional frames.

17. In a car fender a frame, two pivoted links engaging the frame, two members, two locking members pivoted to the links having extending portions for engaging the first mentioned members respectively, an additional member, two springs secured to the additional member and which are adapted to be hooked on the extending portions of the locking members respectively when they are in predetermined positions, and which will be freed when the locking members rotate on their pivots, additional frames for moving relatively to the first-mentioned frame, the locking members being normally engaged by the additional frames, and additional springs for holding the locking members relatively to the links respectively.

18. In a car fender a frame, two pivoted links engaging the frame, two members, two locking members pivoted to the links having extending portions for engaging the first mentioned members respectively, an additional member, two springs secured to the additional member and which are adapted to be hooked on the extending portions of the locking members respectively when they are in predetermined positions, and which will be freed when the locking members rotate on their pivots, additional frames for moving relatively to the first-mentioned frame, the locking members being normally engaged by the additional frame, a rail, and a mat secured to the additional frames having members for traveling on the rail.

19. In a car fender a support, a frame pivoted to the support, an apron hinged to the support, a flange on the frame for engaging the apron to support its free end when the frame is in a predetermined position relatively to the support, a mat, and means connecting the mat with the frame.

20. In a car fender a support, a frame pivoted to the support, an apron hinged to the support, a flange on the frame for engaging the apron to support its free end when the frame is in a predetermined position relatively to the support, a mat, means connecting the mat with the frame, an arm on the frame, and a valve adapted to be operated by the arm.

21. In a car fender a support, a frame pivoted to the support, an apron hinged to the support, a flange on the frame for engaging the apron to support it when the frame is in a predetermined position relatively to the support, a rail, a mat having members for traveling on the rail, and means connecting the mat with the frame.

22. In a car fender a support, a frame pivoted to the support, an apron hinged to the support, a flange on the frame for engaging the apron when the frame is in a predetermined position relatively to the support, a rail, a mat constructed of a series of coiled springs with means for holding the springs in position spaced from each other, means secured to the mat for traveling on the rail, and means connecting the mat with the frame.

23. In a car fender a support, a frame pivoted to the support, an apron hinged to the support, a flange on the frame for engaging the apron to support it when the frame is in a predetermined position relatively to the support, a rail, a mat having members for traveling on the rail, means connecting the mat with the frame, and means for locking the frame.

24. In a car fender a support, a frame pivoted to the support, a rail, a mat having members for traveling on the rail, means connecting the mat with the frame, and means for locking the frame.

25. In a car fender a support, a frame pivoted to the support, a rail, a mat having members for traveling on the rail, a second frame having an orifice, a bolt on the first-mentioned frame extending through the orifice, means for holding the second frame yieldingly in the direction of the first-mentioned frame, and locking means connected with the first-mentioned frame, and engaging the second-mentioned frame when in normal position and holding the first-mentioned frame in operative position.

26. In a car fender a frame, pivoted on a vertical axis, a second frame movable relatively to the first-mentioned frame, means for swinging the first-mentioned frame, and a locking means for the first-mentioned frame adapted to be freed by the movement of the second-mentioned frame relatively to the first-mentioned frame.

27. In a car fender a frame, pivoted on a vertical axis, a second frame movable relatively to the first-mentioned frame, and locking means for the first-mentioned frame adapted to be freed by the movement of the second-mentioned frame relatively to the first-mentioned frame.

28. In a car fender a frame having link engaging means, a link pivoted on an axis which from one end to the other is disposed on a line extending from the front to the rear of the car fender, and engaging the means on the frame, a mat, and means by which the mat is carried by the frame.

29. In a car fender a frame having link engaging means, a link pivoted on an axis which from one end to the other is disposed on a line extending from the front to the rear of the car fender, and engaging the means on the frame, a mat, means by which the mat is carried by the frame, and resilient means for moving the link laterally.

In testimony whereof I have signed my name to this specification in the presence of the subscribing witnesses.

CHARLES B. MARTIN.

Witnesses:
 GEO. P. LENT,
 TRAFTON M. DYE,
 ERNEST KOCH.